(12) United States Patent
Dieterich et al.

(10) Patent No.: US 8,530,776 B2
(45) Date of Patent: Sep. 10, 2013

(54) DE-STACKER WITH A LIFTER TABLE AND WELDING DEVICE FOR CONTAINER BODIES INCLUDING A DE-STACKER

(75) Inventors: Daniel Dieterich, Hittnau (CH); Peter Bertschi, Urdorf (CH)

(73) Assignee: Soudronic AG, Bergdietikon (CH)

( * ) Notice: Subject to any disclaimer, the term of this patent is extended or adjusted under 35 U.S.C. 154(b) by 1157 days.

(21) Appl. No.: 12/424,861

(22) Filed: Apr. 16, 2009

(65) Prior Publication Data

US 2009/0261072 A1    Oct. 22, 2009

(30) Foreign Application Priority Data

Apr. 17, 2008  (CH) .......................................... 606/08

(51) Int. Cl.
| | | |
|---|---|---|
| *B65G 59/04* | (2006.01) | |
| *B65H 3/08* | (2006.01) | |
| *B23K 11/08* | (2006.01) | |
| *B23K 37/047* | (2006.01) | |

(52) U.S. Cl.
USPC ..................... 219/59.1; 414/796.7; 414/796.9; 414/797

(58) Field of Classification Search
USPC ............ 219/78.01, 86.1, 86.21, 86.23, 86.24, 219/158, 161; 414/796.7, 796.9, 797
See application file for complete search history.

(56) References Cited

U.S. PATENT DOCUMENTS

| | | | | |
|---|---|---|---|---|
| 3,063,578 A | * | 11/1962 | Millar .......................... | 414/796.7 |
| 3,398,841 A | * | 8/1968 | Mohr .......................... | 414/788.8 |
| 3,601,266 A | * | 8/1971 | Pearne et al. ................. | 414/796 |
| 3,602,377 A | * | 8/1971 | Sims .......................... | 414/796.7 |
| 3,724,687 A | * | 4/1973 | Marschke et al. ............. | 414/797 |
| 3,887,178 A | * | 6/1975 | Fujimoto ..................... | 271/30.1 |
| 4,511,300 A | * | 4/1985 | Lampe et al. ............... | 414/788.9 |
| 4,681,502 A | * | 7/1987 | Staufner .................... | 414/795.8 |
| 4,921,397 A | * | 5/1990 | Watanabe .................. | 414/788.4 |
| 4,988,263 A | * | 1/1991 | Odenthal .................... | 414/795.8 |
| 5,392,630 A | * | 2/1995 | Marinoni et al. .............. | 72/420 |
| 5,632,595 A | * | 5/1997 | Mori et al. ................. | 414/795.6 |

(Continued)

FOREIGN PATENT DOCUMENTS

| | | |
|---|---|---|
| CH | 696486 A5 | 7/2007 |
| DE | 196 16 820 A1 | 10/1996 |

(Continued)

OTHER PUBLICATIONS

European Search Report for Serial No. EP 09 00 5411 dated Jul. 2, 2009.

*Primary Examiner* — Joseph M Pelham
*Assistant Examiner* — Jimmy Chou
(74) *Attorney, Agent, or Firm* — McCormick, Paulding & Huber LLP

(57) ABSTRACT

Thus a lifter table de-stacker 1 is provided comprising a lifter table 3 with a stack 10 holding device 4 above the lifter table. The holding unit positions the stack by motorized guiding elements 14 and 15. A de-stacking unit and in particular a suction unit is provided which can be adjusted in its position above the stack 10 by a motor as well. The lifter table de-stacker with the motorized adjustability of the guiding elements and the de-stacker provides for a very fast adaptation to different sheet metal blank sizes. Such a lifter table de-stacker is preferably provided for feeding sheet metal blanks into a rounding apparatus which is feeding rounded blank container bodies into a resistance seam welding machine for container bodies.

10 Claims, 1 Drawing Sheet

(56) References Cited

U.S. PATENT DOCUMENTS

| | | | |
|---|---|---|---|
| 5,695,314 A * | 12/1997 | Hohmann et al. | 414/796.6 |
| 5,700,128 A * | 12/1997 | Tonnigs et al. | 414/789.1 |
| 5,718,559 A * | 2/1998 | Freund | 414/797 |
| 5,733,101 A * | 3/1998 | van der Hijden | 414/792.9 |
| 5,743,706 A * | 4/1998 | Happ et al. | 414/797 |
| 5,765,984 A * | 6/1998 | Stefano et al. | 414/222.08 |
| 5,788,455 A * | 8/1998 | Krupica et al. | 414/797 |
| 5,796,065 A * | 8/1998 | Fujiyoshi et al. | 219/78.02 |
| 5,803,446 A * | 9/1998 | Leuthold et al. | 271/9.08 |
| 5,807,065 A * | 9/1998 | Kuhl | 414/796.7 |
| 5,899,341 A * | 5/1999 | Irita | 209/571 |
| 6,006,638 A * | 12/1999 | Eltringham | 83/86 |
| 6,024,530 A * | 2/2000 | Kleineisel et al. | 414/752.1 |
| 6,030,171 A * | 2/2000 | Johnson et al. | 414/797 |
| 6,113,346 A * | 9/2000 | Blake et al. | 414/811 |
| 6,168,151 B1 * | 1/2001 | Tsuchida | 271/126 |
| 6,179,549 B1 * | 1/2001 | Hayakawa | 414/796.7 |
| 6,413,034 B1 * | 7/2002 | Wen-Yung | 414/795.6 |
| 6,422,801 B1 * | 7/2002 | Solomon | 414/416.07 |
| 6,468,025 B1 * | 10/2002 | Stumpf et al. | 414/797 |
| 6,524,058 B1 * | 2/2003 | Watters | 414/795.7 |
| 6,748,294 B1 * | 6/2004 | Overman et al. | 700/224 |
| 6,886,827 B2 * | 5/2005 | Dachtler | 271/106 |
| 6,971,838 B2 * | 12/2005 | Johnson et al. | 414/796.7 |
| 7,199,334 B2 * | 4/2007 | Friedman et al. | 219/385 |
| 7,287,952 B2 * | 10/2007 | Ricci et al. | 414/796.6 |
| 7,329,083 B2 * | 2/2008 | Nakazato et al. | 414/788.7 |
| 7,645,108 B2 * | 1/2010 | Benko | 414/490 |
| 7,744,337 B2 * | 6/2010 | Kaufmann et al. | 414/796.9 |
| 7,755,002 B2 * | 7/2010 | Jeong | 219/158 |
| 7,792,609 B2 * | 9/2010 | Strasser et al. | 700/258 |
| 7,913,621 B2 * | 3/2011 | Miyoshi | 101/477 |
| 8,061,960 B2 * | 11/2011 | Hopwood et al. | 414/795.8 |
| 8,152,160 B2 * | 4/2012 | Ouellette et al. | 271/161 |

FOREIGN PATENT DOCUMENTS

| | | |
|---|---|---|
| DE | 103 13 299 A1 | 1/2004 |
| JP | 58 128728 U | 8/1983 |
| JP | 58 189033 U | 12/1983 |

* cited by examiner

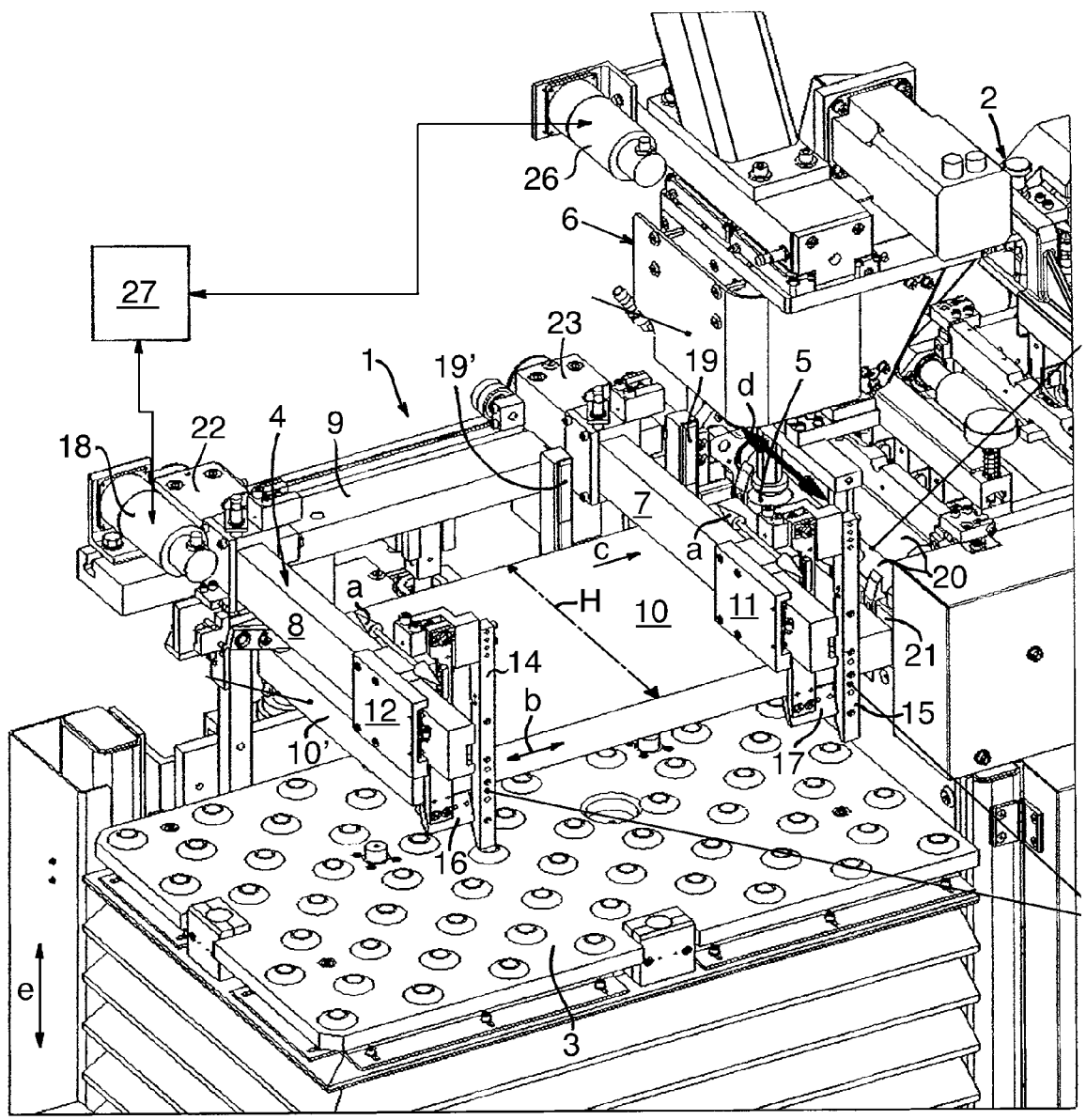

DE-STACKER WITH A LIFTER TABLE AND WELDING DEVICE FOR CONTAINER BODIES INCLUDING A DE-STACKER

CROSS REFERENCE TO RELATED APPLICATIONS

This application claims the priority of Swiss patent application 0606/08, filed Apr. 17, 2008, the disclosure of which is incorporated herein by reference in its entirety.

BACKGROUND OF THE INVENTION

The invention relates to de-stacker with a lifter table. The invention further relates to a rounding apparatus with such a de-stacker as well as to a resistance welding apparatus for container bodies, e.g. can bodies, with such a rounding apparatus comprising a de-stacker lifter table.

PRIOR ART

De-stackers with lifter tables are known. Such de-stackers serve for the de-stacking of flat articles from a stack of such articles, for example for the de-stacking of single sheet metal blanks from a stack of sheet metal. During the de-stacking from a stack, the lifter table allows to prepare a further stack of articles below of the stack that is being worked on, and this second stack can be lifted up in a working position timely before the first stack is empty and will be added from below to the first stack, so that an interrupt free de-stacking of several stacks of articles is possible (so called non-stop lifter table de-stacker). Adaptation of the stack holders and the de-stacker itself (e.g. including a suction unit picking the articles up by vacuum) to the dimensions of the articles is done manually and is time consuming. In particular, when the lifter table de-stacker is part of a welding machine for welding container bodies and in particular can bodies, each change of can body height or can body diameter leads to the change of the sheet metal stack size and needs the adaptation of the lifter table de-stacker.

Swiss patent CH-A-696 486 shows a de-stacker for metal sheet for the making of container bodies that de-stacks from the underside of the stack and works without a lifter table. This document shows adjustable lateral arms to adapt the de-stacker to this size of the sheet that later determines the height of the container. This adjustment can be made manually but as well by a motor. Only a manual size adjustment is provided in the direction of the sheet blank determining the diameter of the container. The de-stacker unit itself is not adjusted at all.

BRIEF SUMMARY OF THE INVENTION

It is an object of the present invention to provide an apparatus to overcome these drawbacks and to provide a lifter table de-stacker that allows a simplified adaptation to the size of the articles and improves on the de-stacking reliability.

Now, in order to implement these and still further objects of the invention, which will become more readily apparent as the description proceeds, the lifter table de-stacker comprises a lifter table for a complete stack of the articles to be lifted, a holding unit arranged above the lifter table and provided for holding and positioning of a stack of the articles that is being worked on said holding unit being provided for taking up of a stack that is lifted by the lifter table, and a de-stacking unit, in particular a suction unit, arranged to act from above on the stack positioned in the holding unit, wherein the holding unit is provided for the positioning of the stack with fixed stops and with guiding elements that are adjustable by a control and a motor and wherein the de-stacking unit is adjustable by said control and a motor in its position above the stack position of the holding unit.

The motorized adjustment of the de-stacking unit, being particularly a suction unit, in combination with the motorized adjustment of the guiding elements as well, shortens the adjustment time considerably. It further improves on the de-stacking reliability by adaptation of the position of the de-stacking unit.

In a preferred embodiment of the lifter table de-stacker the position of the de-stacking unit is adjustable automatically in dependency of the adjustment of the guiding elements. This results in an automatic optimum position of the de-stacking unit in its position above the stack when the change-over to a new product size is made.

Preferably two guiding elements are provided for which are preferably guiding rails arranged vertically. These guiding elements add to the fixed stops provided opposite to the guiding elements. In their lower section they are each provided with a pivoting lever for holding the sheet metal stack. The stack lifted by the lifter table can thus be taken up by being supported by the levers of the holding unit which then supports the stack at the right positions set by the adjustment. The motorized adjustment of the guiding elements is provided for on the one hand for adjusting to this dimension of the sheet metal stack which later results in the height of the container body. On the other hand at least one of the guiding elements in the other dimension of the sheet metal stack that defines the circumference or the diameter, respectively, of the container body, is preferably adjustable by motor as well.

In a preferred embodiment the lifter table de-stacker is provided on the input side of a rounding apparatus for rounding sheet metal blanks and feeds the rounding apparatus with single blanks. Such a rounding apparatus is preferably part of a resistance seam welding apparatus for container bodies made of sheet metal.

BRIEF DESCRIPTION OF THE DRAWINGS

The invention will be better understood and objects other than those set forth above will become apparent when consideration is given to the following detailed description thereof. Such description makes reference to the annexed drawing, which shows a perspective view of a lifter table de-stacker on a combined rounding and welding machine which is only partly shown.

DETAILED DESCRIPTION OF THE PREFERRED EMBODIMENTS

The FIGURE shows a lifter table de-stacker generally depicted as 1. This de-stacker is provided in front of a rounding apparatus 2 which is only partly shown and which has two feed rolls 20 and which rounding apparatus is part of a combination with a resistance seam welding machine.

In this preferred embodiment the lifter table de-stacker 1 de-stacks single sheet metal blanks from a metal sheet blank stack 10 and feeds them into the rounding apparatus 2. In this rounding apparatus the blanks are rounded to container body blanks which are then welded to container bodies in a resistance seam welding machine that follows the rounding apparatus down the production line for the containers. This is the preferred combination of the lifter table de-stacker according to the present invention. But it is possible to use this de-stacker for other de-stacking purposes.

The lifter table de-stacker 1 is provided with a lifter table 3 onto which the stacks of the products to be de-stacked can be loaded when the lifter table is in its lowermost (loading) position. The lifter table can be lifted and lowered, respectively, in direction of arrow e by a lifter table drive not specifically shown but known to the skilled person, since lifter tables are known in the art. The lifter table may be provided with a roller table for automatic loading of a stack. The stack to be de-stacked is inserted into a holding unit 4 of the lifter table de-stacker upon lifting of the lifter table 3, where the stack is held in a defined position by the holding unit. The metal sheet stack 10 held in holding unit 4 is then de-stacked blank by blank from above by the de-stacking unit 6. The de-stacking unit 6 is in particular a suction unit with a vacuum suction cup or several suction cups. By this suction cup or the suction cups, respectively, the uppermost sheet metal blank of the stack 10 is lifted and moved into feed rolls 20 of the rounding apparatus. The separation of the sheet can be helped in a well known way by fanning magnets. The de-stacking unit 6 is provided with a drive that provides the necessary movement to the suction cup(s) and thus to the sheet metal blank held by the cup(s). This is known to the skilled person and is not explained here in detail. The insertion of a stack from below into the holding unit 4 is as well solved in a generally known manner by providing this holding unit with pivotable levers, which are pivoted by the upper edges of the sheet metal stack when this stack is lifted by the lifter table 3 so that the sheet metal stack can be introduced from below into the holding unit 4 by passing the pivoted levers. The lifter table lifts the stack placed thereon to such a height that the pivoted levers are no longer contacted by the stack so that they pivot back into their horizontally extending position. When the lifter table is then moved downwards, the sheet metal stack comes to rest on the levers blocking the downward movement of the stack and the stack is thereby held in the holding unit by the levers acting on the underside of the stack. As mentioned earlier, the lifter table can insert a new stack from below again while the stack inserted beforehand is still being de-stacked. The lifter table de-stacker thus allows for a non-stop operation until all stacks to be de-stacked have been processed.

The sheet metal stack is not only held but is as well positioned within holding unit 4. To this end the holding unit is preferably provided on the one hand with fixed stops. In the FIGURE fixed stops 19 and 19' as lateral stops for the longer rear side edge of the sheet metal stack 10 can be seen and are preferably provided as vertical guide rails. Additional fixed stops may be provided. The front face (in de-stacking direction) of the sheet metal stack 10, which thus is nearer to the feeding rollers 20, may be positioned by a fixed stop 21. Adjustable guiding elements for adaptation of the holding unit 4 to the actual sheet metal blank size i.e. sheet metal blank stack size, are shown as preferred example by guide rails 14 and 15. On these guide rails two of the mentioned pivotable levers are shown as levers 16 and 17, which support the stack from underneath. Of course, corresponding levers are arranged on the opposite side of the stack so that the stack is supported on the opposite edge as well, but these levers can not be seen in the FIGURE. The sheet metal stack shown has a shorter dimension H and a longer dimension not provided with a reference, so that the stack has a brick shape with a rectangular footprint; the stack may of course have a square footprint as well. The transverse dimension H results in the production by the production line of container bodies with a corresponding container body height. The longitudinal dimension results in a corresponding circumference of the container body. During the production of containers different sizes of sheet metal blanks and accordingly different sizes of sheet metal stacks are used in the production line, depending on the requested size of the containers. In particular the size H and thus the container height is changed quite often. For adaptation of the holding unit 4 to the sheet size or stack size, respectively, the position of the guide rails 14 and 15 can be adjusted by motor and controlled by the control 27. At the same time the position of the levers 16 and 17 is adjusted. In the shown embodiment the holding unit 4 is provided with arms 7 and 8 which extend over the metal sheet stack position of the holding unit 4. The arms 7 and 8 are connected to the stationary machine base 9. Arranged on arms 7 and 8 are motor driven sliding carriages 11 and 12 that are drivable in direction of arrows a. These carriages 11 and 12 carry the guiding elements or guide rails 15 and 14, respectively. The motorized carriages 11 and 12 on arms 7 and 8 allow the adaptation to the size H of the stack. Opposite to the adjustable guiding elements 14 and 15 are several fixed guiding elements or stops, respectively, of which the stops 19' and 19 can be seen in the FIGURE (and at least one other stop is provided opposite guiding element 14 and covered from sight by arm 8) on which the stack abuts with its opposite edge. Thus the holding unit can be adjusted to the size H of the stack 10 and thus to the width H of the sheet metal blanks by the motorized adjustment of the carriages.

It is preferred to include a motorized adjustment for adaptation to the length of the sheet metal blanks or the stack, respectively, as well. Preferably, the rear guiding element (the "rear" being defined in view of the transport direction c and the "front" being the side of the stack facing the feed rollers 20) and thus in this example the guide rail 14 and the lever 16 are adjustable in transport direction and in opposite direction. This is done as well by the control 27 and in dependency of the sheet metal blank size. In the shown example the arm 8 is fixed on a carriage 22 which can be moved along the shown member of the base 9 by a motor not shown in the FIGURE. In addition or in the alternative arm 7 may be movable along member 9 by a carriage 23 as well.

The detail construction of the motorized carriages 11, 12, 22 and 23 is not explained here, since such carriage drives are well known to the skilled person, e.g. in the form of spindle drives, chain drives or gear drives so that the skilled person can select the suitable drive. In the FIGURE a motor 18 is shown representing an example for a carriage drive. The control 27 may be a personal computer or a dedicated industrial control controlling the carriage drives. The control 27 adjusts the carriages based on input values or preset values, respectively, for the size of the metal sheet blanks or the stack size, respectively, and in particular size H and the length of the sheet metal blank.

The control 27 controls as well the motor 26 which is provided to adjust the de-stacking unit or suction unit 6, respectively, in direction of arrow d. This adjustment is independent of the known de-stacking movement of the suction unit 6 which is known and which feeds single sheet blanks into the feed rollers 20 and which is not explained here in detail. The motorized adjustment of the de-stacking unit 6 by motor 26 is on the other hand provided for adjusting the de-stacking unit into a position that is adapted to the sheet blank position on the lifter table and the sheet blank size, in particular size H thereof. Preferably the adjustment of the de-stacker 6 is thus done in dependency of the adjustment of the guiding elements 14 and 15, so that for each adjustment of these guiding elements a corresponding adjustment of the de-stacker position is provided by control 27. The de-stacker is preferably arranged on a carriage as well, which can be driven by motor 26. Such a construction for the adjustment of the de-stacker is known to the skilled person and needs no detail description here.

Thus by the simple input of the stack size or by selecting a given stack size the holding unit 4 is adjusted and at the same time the optimum position of the de-stacker 6 and thus for its suction cup 5 can be attained. This optimum position is preferably set such that the suction cup is adjusted to the middle of the size H of the sheet metal blank.

Thus a lifter table de-stacker 1 is provided comprising a lifter table 3 with a stack 10 holding device 4 above the lifter table. The holding unit positions the stack by motor-driven guiding elements 14 and 15. A de-stacking unit and in particular a suction unit is provided which can be adjusted in its position above the stack 10 by a motor as well. The lifter table de-stacker with the motor-driven adjustability of the guiding elements and the de-stacker provides for a very fast adaptation to different sheet metal blank sizes. Such a lifter table de-stacker is preferably provided for feeding sheet metal blanks into a rounding apparatus which is feeding rounded blank container bodies into a resistance seam welding machine for container bodies.

While there are shown and described presently preferred embodiments of the invention, it is to be distinctly understood that the invention is not limited thereto but may be otherwise variously embodied and practised within the scope of the following claims.

The invention claimed is:

1. A lifter table de-stacker, comprising:
   a lifter table for taking up a stack of flat product to be de-stacked,
   a holding unit arranged above said lifter table and provided for holding and positioning of a stack of the flat product being de-stacked and for taking up from below a stack of the flat product that is liftable by said lifter table, and
   a de-stacking unit being provided for acting from above on the stack of the flat product being de-stacked,
   said holding unit being provided with fixed stops and with motor-driven guiding elements,
   said motor-driven guiding elements being adjustable by a control controlling said motor-driven guiding elements for the positioning of the stack of the flat product being de-stacked; and
   said de-stacking unit being provided with a motor-drive controlled by said control for adjusting a position of said de-stacking unit with respect to a position of the stack of the flat product being de-stacked within said holding unit.

2. The lifter table de-stacker according to claim 1, wherein said position of said de-stacking unit is adjustable in dependency of the adjustment of the guiding elements.

3. The lifter table de-stacker according to claim 1, wherein the motor-driven guiding elements are adjustable in a direction transverse to the de-stacking direction.

4. The lifter table de-stacker according to claim 3, wherein at least one of the guiding elements is motor-driven adjustable in the de-stacking direction and in a direction opposite to the de-stacking direction.

5. The lifter table de-stacker according to claim 1, wherein the lifter table de-stacker comprises at least four guiding elements, and
   wherein each of the guiding elements is a vertical guide rail having a pivotable lever arranged at a lower section for holding the stack of the flat product being de-stacked.

6. A rounding apparatus adapted for rounding sheet metal blanks to container blanks,
   wherein said rounding apparatus is provided with the lifter table de-stacker according to claim 1.

7. A resistance seam welding apparatus for welding container bodies,
   wherein said resistance seam welding apparatus is provided with the rounding apparatus according to claim 6.

8. A lifter table de-stacker, comprising:
   a lifter table for taking up a stack of flat product to be de-stacked,
   a holding unit arranged above said lifter table and provided for holding and positioning of a stack of the product being de-stacked and for taking up from below a stack that is liftable by said lifter table, and
   a de-stacking unit being provided for acting from above on the stack of the flat product being de-stacked,
   said holding unit being provided with fixed stops and with motor-driven guiding elements,
   said motor-driven guiding elements being adjustable by a control controlling said motor-driven guiding elements for the positioning of said stack of the product being de-stacked,
   wherein the motor-driven guiding elements are adjustable in a direction transverse to the de-stacking direction and at least one of the guiding elements is motor-driven adjustable in a de-stacking direction and in a direction opposite to the de-stacking direction; and
   wherein said de-stacking unit is provided with a motor-drive controlled by said control for adjusting a position of said de-stacking unit with respect to a position of the stack of the flat product being de-stacked within said holding unit, said position of said de-stacking unit being automatically adjustable in dependency of the adjustment of the guiding elements by said control.

9. A resistance seam welding apparatus for welding container bodies being provided with a rounding apparatus adapted for rounding sheet metal blanks to container blanks, said rounding apparatus being provided with a lifter table de-stacker, comprising:
   a lifter table for taking up a stack of the flat product to be de-stacked,
   a holding unit arranged above said lifter table and provided for holding and positioning of a stack of the flat product being de-stacked and for taking up from below a stack of the flat product that is liftable by said lifter table, and
   a de-stacking unit being provided for acting from above on the stack of the flat product being de-stacked,
   said holding unit being provided with stops and with motor-driven guiding elements,
   said motor-driven guiding elements being adjustable by a control controlling said motor-driven elements for the positioning of said stack of the flat product being de-stacked wherein the motor-driven guiding elements are adjustable in a direction transverse to the de-stacking direction and at least one of the guiding elements is motor-driven adjustable in a de-stacking direction and in a direction opposite to the de-stacking direction; and
   said de-stacking unit is provided with a motor-drive controlled by said control for adjusting a position of said de-stacking unit with respect to a position of the stack of the flat product being de-stacked within said holding unit, wherein said position of said de-stacking unit is adjustable in dependency of the adjustment of the guiding elements.

10. The lifter table de-stacker according to claim 2, wherein each of the motor-driven guiding elements is adjustable in the direction transverse to a de-stacking direction.

* * * * *